O. M. Brock,
Horse Power.
No. 110,892.   Patented Jan. 10, 1871.
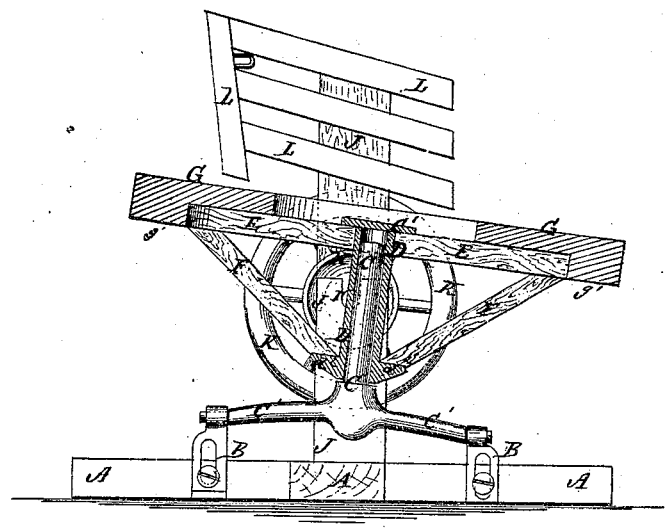
Witnesses:   Inventor
             O. M. Brock
             Attorneys.

United States Patent Office.

ORVILLE M. BROCK, OF MONROETON, PENNSYLVANIA, ASSIGNOR TO JAMES H. HAWES AND GEORGE HAWES, OF SAME PLACE.

Letters Patent No. 110,892, dated January 10, 1871.

IMPROVEMENT IN ANIMAL-POWER APPARATUS.

The Schedule referred to in these Letters Patent and making part of the same.

*To all whom it may concern:*

Be it known that I, ORVILLE M. BROCK, of Monroeton, in the county of Bradford and State of Pennsylvania, have invented a new and useful Improvement in Animal-Power; and I do hereby declare that the following is a full, clear, and exact description thereof, which will enable others skilled in the art to make and use the same, reference being had to the accompanying drawing forming part of this specification, in which the figure is a detail sectional view of my improved power.

My invention has for its object to furnish an improved power, designed to be operated by a dog, sheep, or other small animal, for operating a churn or driving other machinery, and which shall at the same time be simple in construction and convenient in use, being easily adjusted according to the weight of the animal that is to operate it; and It consists in the construction and combination of the various parts of the power, as hereinafter more fully described.

A is the base frame of the machine, consisting of two beams crossing each other at right angles, and halved to each other, to give a level foundation.

To one of the beams A are secured the lower ends of two arms, B, by bolts, which pass through vertical slots in said arms, so that by loosening the said bolts the arms B, or either of them, may be raised or lowered to tilt or incline the wheel more or less according to the weight of the animal that is to drive it.

In the upper ends of the arms B are formed eyes, sockets, or bearings, for the journals formed upon the ends of the cross-arms $c'$, formed upon the lower end of the spindle C, as shown in the figure, to allow the said spindle to be inclined more or less according as more or less tilt or inclination may be given to the wheel.

D is a hollow shaft, flanged at both ends, which fits and works upon the spindle C.

E are the radial arms of the wheel, the inner ends of which are securely bolted to the upper flange $d^1$, of the hollow shaft D.

To the outer parts of the radial arms E are securely bolted the outer or upper ends of the inclined braces F, the inner or lower ends of which rest upon and are securely bolted to the lower flange $d^2$ of the hollow shaft D.

G is the rim of the wheel, which should be made of sufficient width to allow the animal to walk comfortably upon it.

Upon the lower side of the outer part of the rim G is formed a narrow rim, $g'$, which rests upon the small pulley or wheel H, attached to the drive-shaft I.

The rim $g'$ and wheel H may be both smooth to work by friction, or may both be cogged or toothed, as may be desired.

The shaft I revolves in bearings in a post or posts J, attached to one of the beams A, and to the outer end of said shaft is attached a wheel, K, which is made heavy, so as to serve at the same time as a fly wheel, and as a crank or band-wheel for communicating motion to the machinery to be driven.

The upper end of the post J projects above the wheel E F G, and has a guard-rack fence or stall, L, attached to it, to keep the animal in place upon said wheel, the forward end of said rack projecting across the rim G for the animal to be tied to.

Having thus described my invention,

I claim as new and desire to secure by Letters Patent—

1. The hollow shaft D $d^1$ $d^1$, flanged at both ends, in combination with the radial arms E, inclined braces F, rim G, and rim or wheel $g'$, the said parts being constructed and operating in connection with the pulley or wheel H of the driving-shaft I, substantially as herein shown and described, and for the purpose set forth.

2. The adjustable cross-armed spindle C $c'$, and adjusting-arms B, in combination with the wheel D E F G, substantially as herein shown and described, and for the purpose set forth.

ORVILLE M. BROCK.

Witnesses:
W. H. HAWES,
B. B. HOLLETT.